(12) United States Patent
Mimura et al.

(10) Patent No.: US 6,483,212 B1
(45) Date of Patent: Nov. 19, 2002

(54) RELUCTANCE-TYPE ELECTRIC MOTOR

(75) Inventors: Naohisa Mimura, Hamamatsu (JP); Yoshiyuki Takabe, Hamamatsu (JP); Shinji Makita, Kariya (JP); Tomohiro Saitou, Kariya (JP); Hideji Yoshida, Hashima (JP)

(73) Assignee: Asmo Co., Ltd., Shizuoka (JP)

( * ) Notice: Subject to any disclaimer, the term of this patent is extended or adjusted under 35 U.S.C. 154(b) by 59 days.

(21) Appl. No.: 09/678,847

(22) Filed: Oct. 4, 2000

(30) Foreign Application Priority Data

Oct. 6, 1999 (JP) .............................. 11-285456

(51) Int. Cl.[7] .............................................. H02K 11/00
(52) U.S. Cl. ...................... 310/68 R; 310/168; 310/187; 318/254
(58) Field of Search ................ 310/68 R, 168, 310/187, 269, 162, 166; 318/254

(56) References Cited

U.S. PATENT DOCUMENTS

| | | | | |
|---|---|---|---|---|
| 4,647,802 A | * | 3/1987 | Konecny ..................... 310/162 |
| 4,933,620 A | * | 6/1990 | MacMinn et al. ........... 318/685 |
| 5,111,095 A | * | 5/1992 | Hendershot .......... 174/DIG. 19 |
| 5,138,244 A | * | 8/1992 | Bahn .......................... 318/254 |
| 5,341,076 A | * | 8/1994 | Bahn .......................... 310/166 |
| 5,355,069 A | * | 10/1994 | Bahn .......................... 318/685 |
| 5,418,415 A | * | 5/1995 | Ishizaki ...................... 310/162 |
| 5,621,294 A | * | 4/1997 | Bessette et al. ............. 318/573 |
| 5,717,269 A | * | 2/1998 | Tang ........................... 310/168 |
| 5,747,912 A | * | 5/1998 | Sakuma et al. ............. 310/168 |
| 5,917,263 A | * | 6/1999 | Sakuma et al. ............. 310/168 |
| 5,936,386 A | * | 8/1999 | Heglund ...................... 318/701 |
| 6,011,377 A | * | 1/2000 | Heglund et al. ............. 318/254 |
| 6,091,168 A | * | 7/2000 | Halsey et al. ............... 310/166 |
| 6,194,804 B1 | * | 2/2001 | Nashiki ....................... 310/166 |

FOREIGN PATENT DOCUMENTS

JP 8-126273 5/1996

* cited by examiner

Primary Examiner—Joseph Waks
(74) Attorney, Agent, or Firm—Law Offices of David G. Posz

(57) ABSTRACT

A reluctance-type motor include a stator having a plurality of salient stator-poles, a rotor having a plurality of salient rotor-poles, a multi-phase coils mounted in the stator, and a driver circuit for driving said multi-phase coil. The driver circuit starts to supply drive current to the multi-phase coils when the salient rotor-poles and the salient stator-poles come across each other. In other words, the drive current is supplied to the multi-phase coils when the inductance thereof is zero.

9 Claims, 8 Drawing Sheets

FIG. 1A
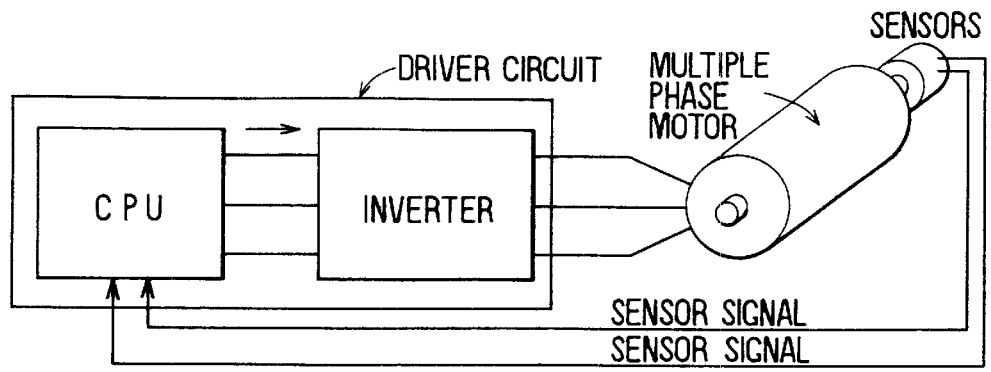
FIG. 1B
PRIOR ART
FIG. 1C
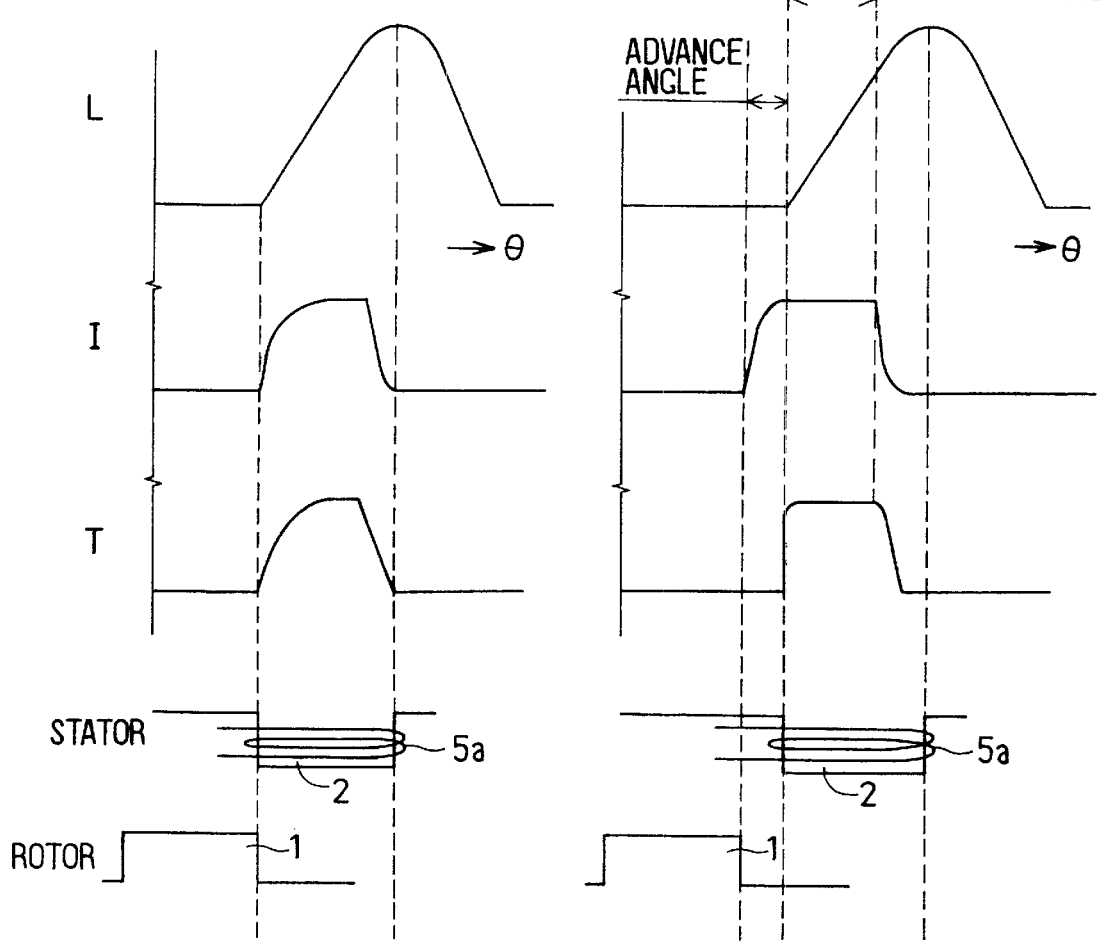

RELUCTANCE-TYPE ELECTRIC MOTOR

CROSS REFERENCE TO RELATED APPLICATION

The present application is based on and claims priority from Japanese Patent Application Hei 11-285456 filed on Oct. 6, 1999, the contents of which are incorporated herein by reference.

BACKGROUND OF THE INVENTION

1. Field of the Invention

The present invention relates to a reluctance-type electric motor.

2. Description of the Related Art

In general, a multi-phase reluctance-type motor is controlled by a driver circuit as shown in FIG. 1A. The driver circuit includes a CPU and processes sensor signals delivered thereto from the multiple-phase reluctance-type motor. Such a reluctance-type motor is simple in structure and provides a comparatively large output torque. However, it has been used in limited fields because of its high torque ripples.

As shown in FIG. 1B, a phase coil of a reluctance-type motor is usually supplied with drive current when a salient rotor-pole and a salient stator pole come across each other and the inductance thereof starts to increase. The current supply is stopped when the inductance does not increase.

The current that is supplied to the coil gradually increases after the rotor salient pole and the stator salient pole come across each other and gradually decreases when the increment angle of the inductance changes near its peak. Therefore, the torque provided by the salient poles changes gradually. In other words, the torque characteristic is not flat. This mainly causes the above-stated torque ripples.

SUMMARY OF THE INVENTION

A main object of the invention is to provide an improved reluctance-type motor that generates a flat torque so as to reduce the torque ripples.

According to a main feature of the invention, a reluctance-type motor includes a stator having a plurality of salient stator-poles, a rotor having a plurality of salient rotor-poles, a multi-phase coils mounted in the stator, and a driver circuit for driving the multi-phase coil. The driver circuit starts to supply drive current to one of the phase coils when the salient rotor-poles and the salient stator-poles having the one of the phase-coils come across each other, while the inductance thereof is zero. Preferably, the driver circuit stops supplying the drive current before the increment angle of the inductance changes.

In the above-stated reluctance-type motor, the salient stator-poles and the salient rotor-poles are formed of laminated sheets of magnetic material and have a plurality of slits. The width of the slot is, preferably, equal to or larger than one fifth of the thickness of the laminated sheet.

BRIEF DESCRIPTION OF THE DRAWINGS

Other objects, features and characteristics of the present invention as well as the functions of related parts of the present invention will become clear from a study of the following detailed description, the appended claims and the drawings. In the drawings:

FIG. 1A is a block diagram of a control system of a typical reluctance-type motor, 1B is a graph showing characteristics of a conventional reluctance-type motor, and FIG. 1C is a graph showing characteristics of a reluctance-type motor according to an embodiment of the invention;

DETAILED DESCRIPTION OF THE PREFERRED EMBODIMENTS

A reluctance-type motor according to a preferred embodiment of the invention is described with reference to FIGS. 1A and 1C–4.

Figure 2:
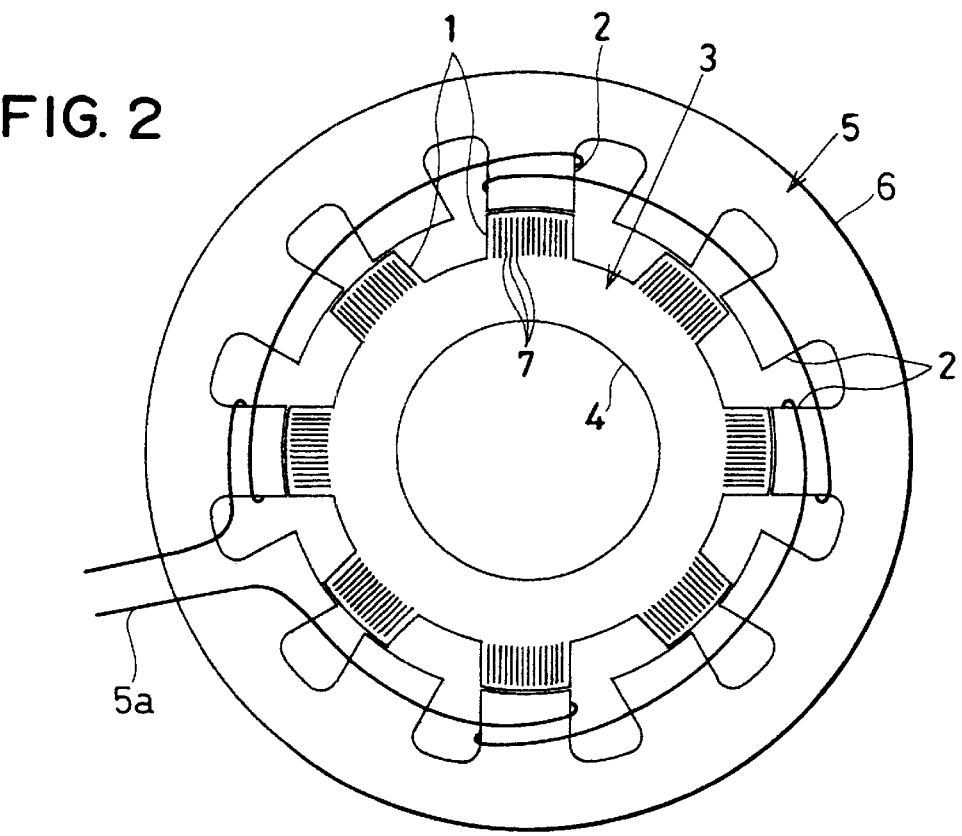
FIG. 2 is a schematic diagram illustrating a rotor and a stator of a three-phase reluctance-type motor according to a first embodiment.
Figure 3:
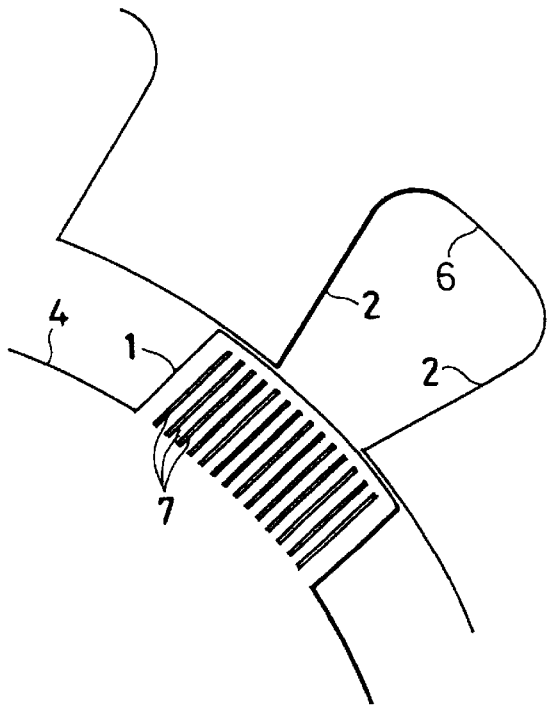
FIG. 3 is a fragmentary enlarged view of the reluctance-type motor illustrated in FIG. 2.
Figure 4:
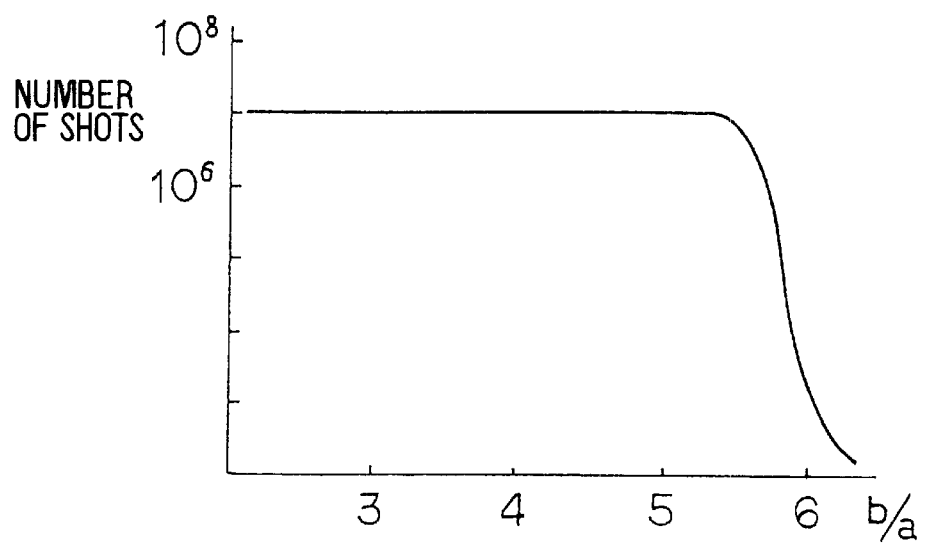
FIG. 4 is a graph showing a relationship between the lifetime of a metal die, the thickness of an iron sheet, and the width of a slit.

In the reluctance-type motor, a driver circuit shown in FIG. 1A starts to supply each phase-coil 5a (only one phase-coil is shown in FIG. 2) with exciting current when the inductance of phase-coil 5a is 0, as shown in FIG. 1C. The exciting current is supplied to phase-coil 5a before a phase angle in advance to the time when the inductance starts to rise up from 0. The phase angle is set to be larger as the rotation speed of the reluctance-type motor increases. Therefore, a sufficient amount of exciting current can be supplied to phase-coil 5a until the inductance has risen up. Phase-coil 5a can also be supplied with constant current I when salient poles 2 having phase-coil 5a thereon come across one of salient rotor-poles 1. As shown in FIG. 1c, torque T is generated immediately after the salient poles 1 and 2 come across each other. On the other hand, the driver circuit stops the current supply to phase-coil 5a while the increment angle of the inductance is constant (i.e. dL/dθ is constant in the linear range), or before it changes.

The torque generated between the salient poles is expressed as follows:

$$T = (1/2) \cdot I^2 \, (dL/d\theta).$$

Because the exciting current I supplied to phase coil 5a is constant, the characteristic of the torque T becomes flat, as shown in FIG. 1C, so that the torque ripples can be reduced.

Figure 5:
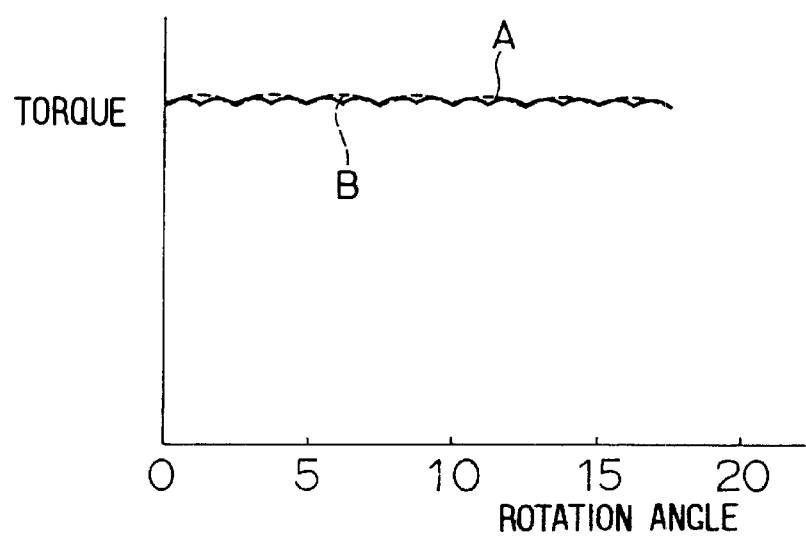
FIG. 5 is a graph showing torque waves provided by salient poles having different slits.

As shown in FIG. 2, a three-phase reluctance-type motor is comprised of rotor 3 and stator 5. Rotor 3 is comprised of rotor core 6 of laminated sheets, and stator 5 is comprised of stator core 6 of laminated sheets and three-phase-coils 5a. Rotor core 6 has a plurality of salient rotor-poles 1 having a plurality of radially extending slits 7 formed therein. The plurality of radially extending slits 7 makes flow of magnetic fluxes in salient rotor-poles 1 smooth. In other words, the plurality of slits makes the increment angle of the inductance dL/dθ constant, thereby providing a flat torque wave. FIG. 5 shows an effect of slits 7. In FIG. 5, solid line A represents a torque curve when fourteen slits are formed in the rotor-pole, and broken line B represents a torque curve when seven slits are formed. Therefore, the torque ripple can be suppressed more effectively, as the number of slits 7 becomes larger.

Figure 11:
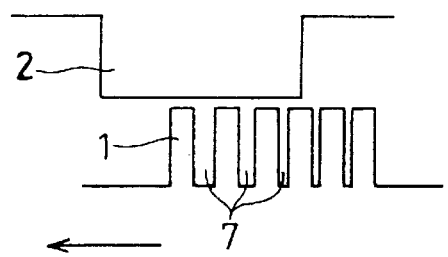
FIG. 11 is a fragmentary schematic diagram illustrating a rotor and a stator core of a reluctance-type motor according to a fifth embodiment of the invention.

Each of slits 7 can be formed in an open slit, as shown in FIG. 11, so that the end thereof reaches the outer edge of the salient pole. The open slits eliminate magnetic path traversing the outer edge of rotor-pole 1, thereby improving the effective magnetic path between rotor-pole 1 and stator-pole 2.

The plurality of slits 7 is formed by a press-machine with a metal die when the laminated sheets are formed thereby. It has been found to increase the lifetime of the metal die or the number of shot times. That is, the maximum ratio between the thickness b of each of the laminated sheets and the width a of each of the slits should be equal to or less than 5. In other words, the width a of slit 7 should be equal to or larger than 1/5 of the thickness b of the laminated sheet.

Figure 6:
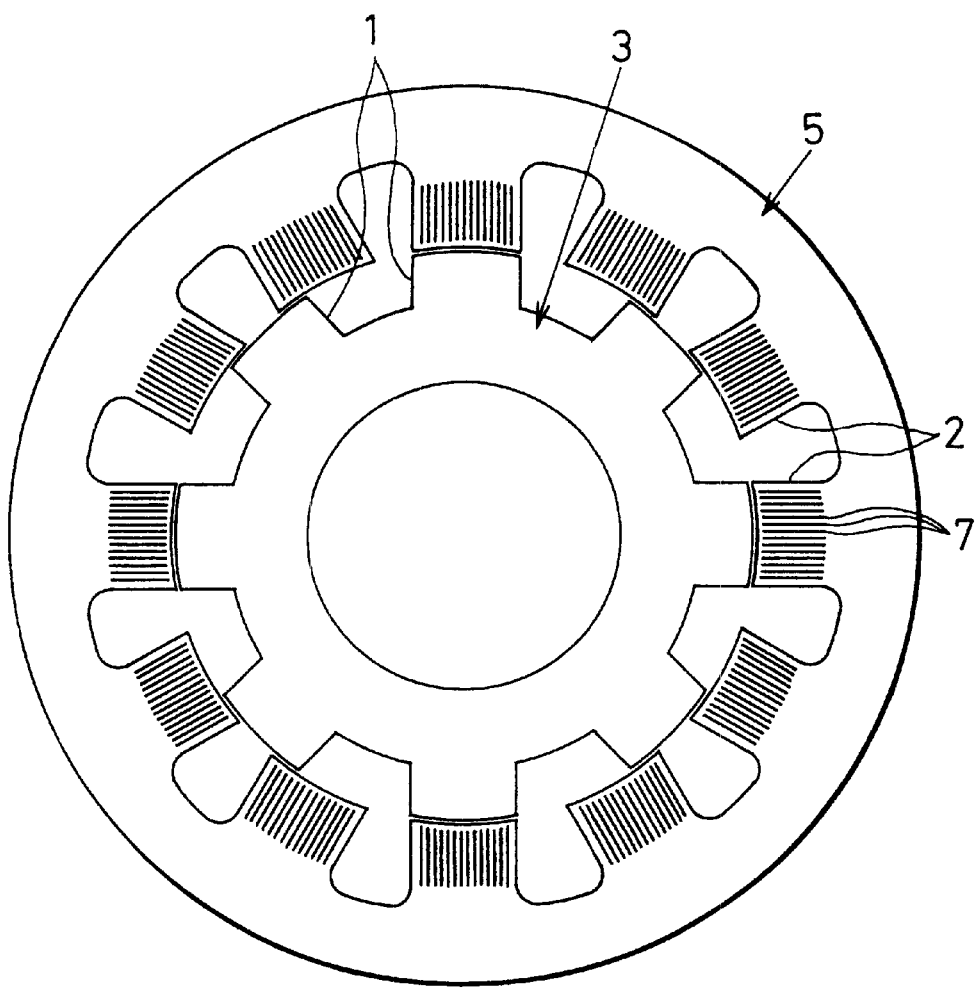
FIG. 6 is a schematic diagram illustrating a rotor and a stator core of a reluctance-type motor according to a second embodiment of the invention.

A reluctance-type motor according to a second embodiment of the invention is described with reference to FIG. 6.

A plurality of slits is formed in salient stator-poles 2 instead of slits 7 formed in salient rotor-poles 1.

Figure 7:
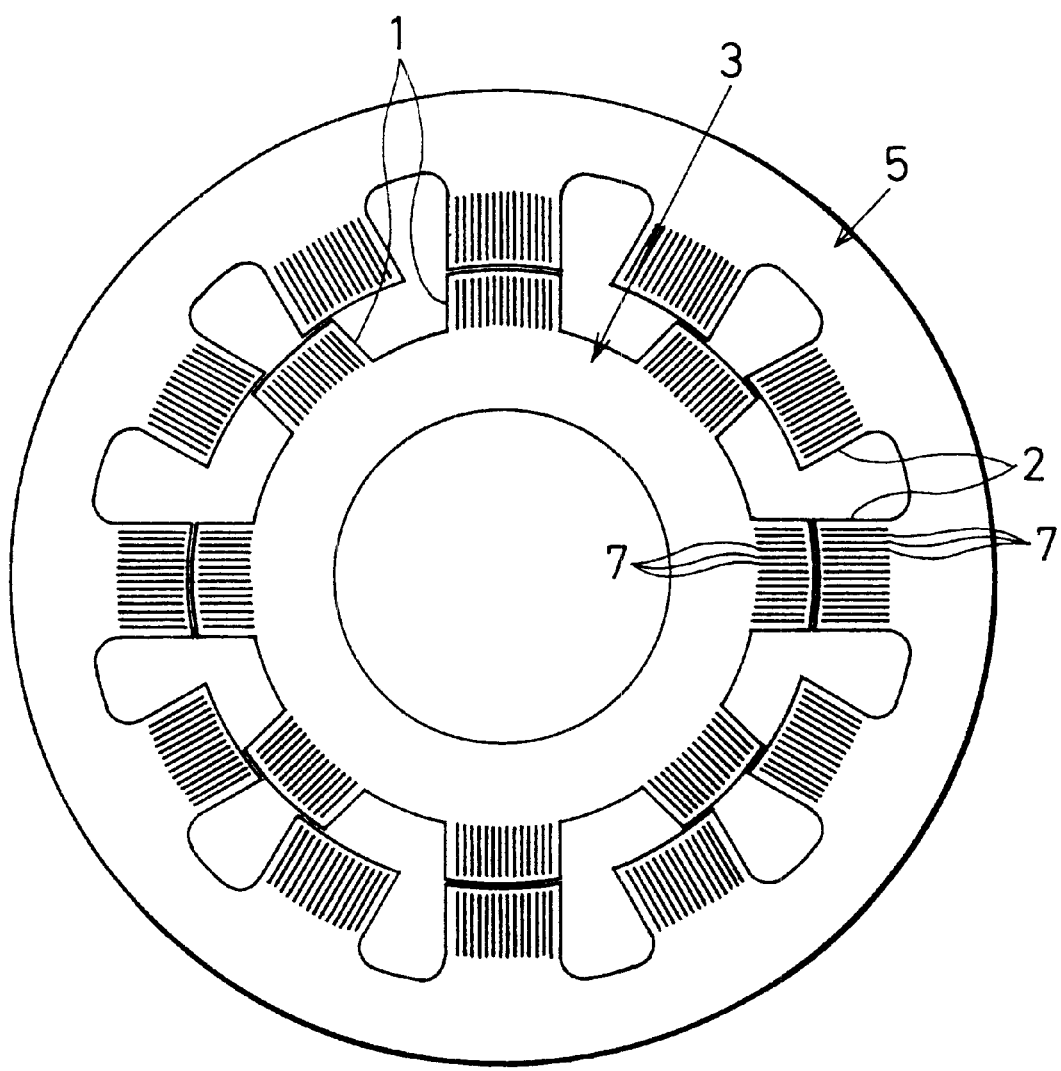
FIG. 7 is a schematic diagram illustrating a rotor and a stator core of a reluctance-type motor according to a third embodiment of the invention.

A reluctance-type motor according to a third embodiment of the invention is shown in FIG. 7. Slits 7 are formed in both rotor-poles 1 and stator-poles 2. The length of each slit 7 in the same pole can be changed also.

Figure 8A:
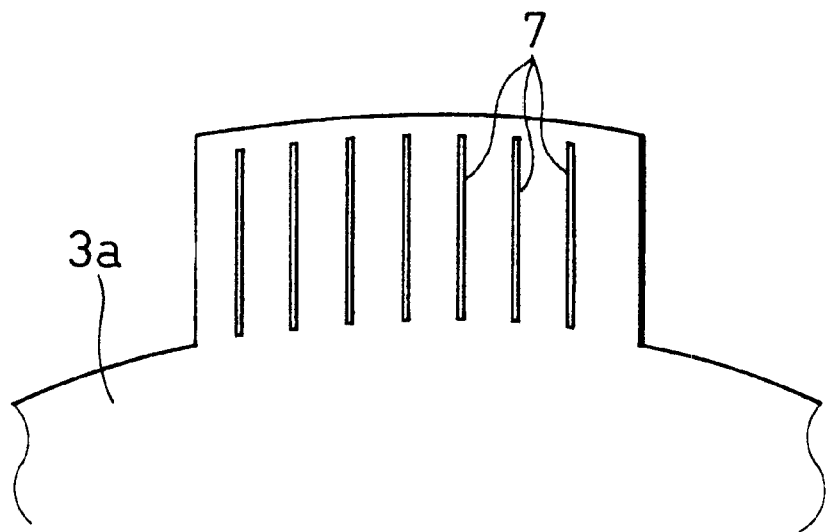
FIGS. 8A and 8B are schematic diagrams illustrating salient rotor-poles having different slits of a reluctance-type motor according to a variation of the embodiment of the invention.
Figure 8B:
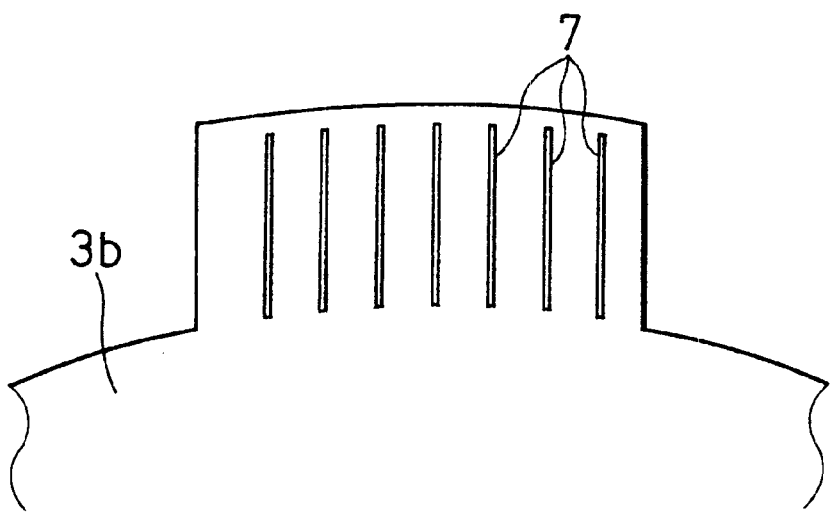

As shown in FIGS. 8A and 8B, a plurality of slits 7 can be formed differently in different laminated sheets 3a and 3b. Therefore, slits 7 of one laminated sheet are disposed between slits 7 of another laminated sheet, so as to provide substantially the same effect as described with reference to FIG. 5.

Figure 9:
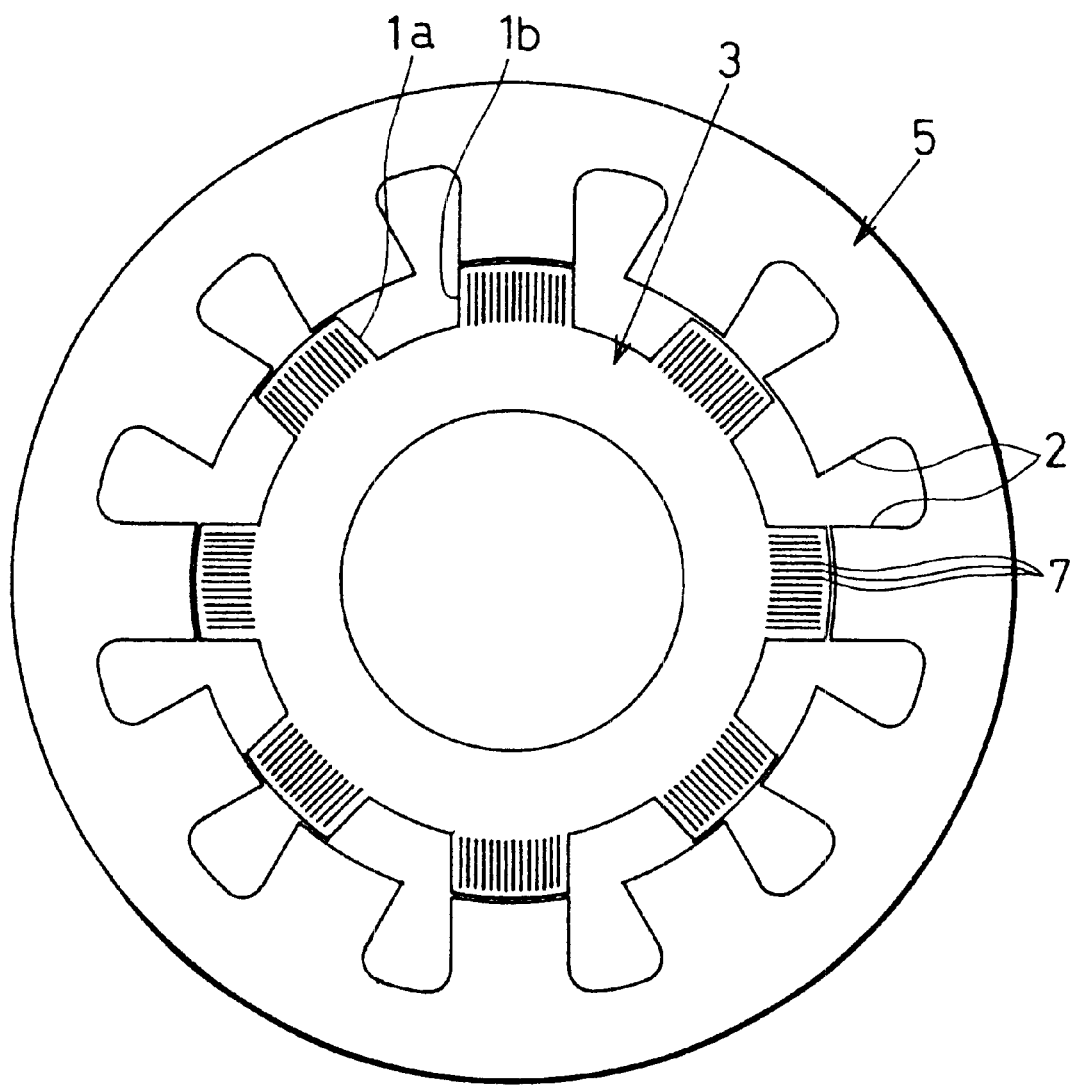
FIG. 9 is a schematic diagram illustrating a rotor and a stator core of a reluctance-type motor according to a third embodiment of the invention.

A reluctance-type motor according to a fourth embodiment is described with reference to FIG. 9. Slits 7 that are formed in one salient rotor-pole 1a is different in number, position or in width from slits 7 formed another salient rotor-pole 1b.

Figure 10A:
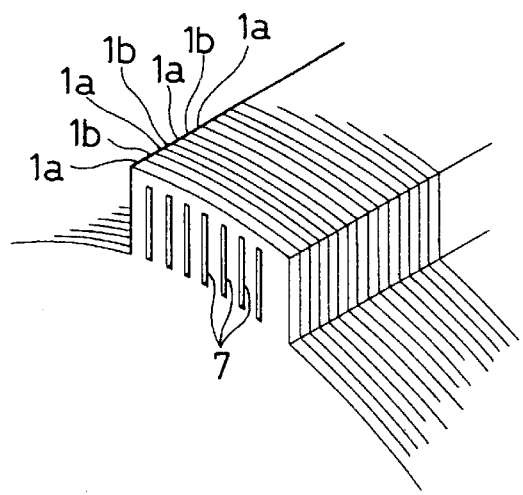
FIG. 10A is a schematic diagram illustrating a salient rotor-pole of a reluctance-type motor according to a fourth embodiment of the invention.
Figure 10B:
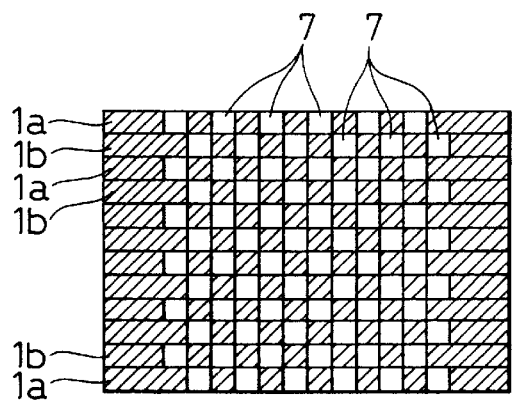
FIG. 10B is a schematic cross-sectional side view of this salient rotor-pole.
Figure 10C:
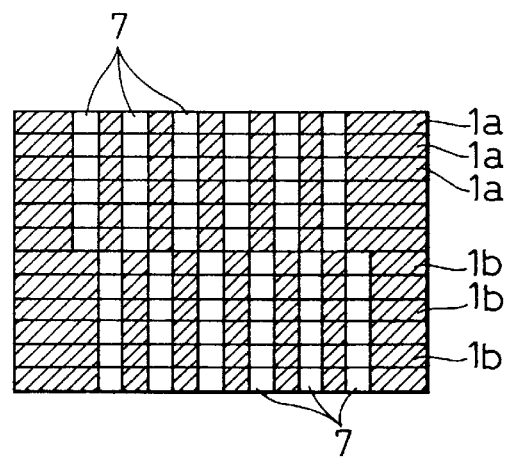
FIG. 10C is a schematic cross-sectional view of a variation of this salient rotor-pole.

A reluctance-type motor according to a fifth embodiment is described with reference to FIGS. 10A and 10B. Laminated sheets are stacked so that a portion of the sheet corresponding to one rotor-pole 1a shown in FIG. 9 is put on a portion of the sheet corresponding to another rotor-pole 1b shown in FIG. 9. As a result, one laminated sheet has different slits in number, position or in size from those of the adjacent laminated sheet. As shown in FIG. 10C, salient rotor pole 1 can be formed of two blocks of laminated sheets having different slits. This is also effective to reduce the torque ripples.

A reluctance-type motor according to a sixth embodiment is described with reference to FIG. 11. Open slits 7 are formed in rotor-pole 1 so that the width of the slits 7 on the front side of rotor-pole 1 in the rotating direction of rotor 3 becomes larger than the width of slits 7 on the rear side. This structure increases the effective air gap so that an abrupt increase in the magnetic flux can be prevented, thereby preventing magnetic saturation at the front side. Because the width of slits at the rear side is formed as small as possible to reduce the effective air gap and to increase the effective magnetic flux without magnetic saturation, the output torque can be prevented from decreasing.

Larger open slits 7 can be formed in rotor-pole 1 on opposite sides of rotor-pole 1 in the rotating direction of rotor 3 to prevent the magnetic saturation thereof if rotor-pole 1 rotates in both direction.

In the foregoing description of the present invention, the invention has-been disclosed with reference to specific embodiments thereof. It will, however, be evident that various modifications and changes may be made to the specific embodiments of the present invention without departing from the broader spirit and scope of the invention as set forth in the appended claims. Accordingly, the description of the present invention is to be regarded in an illustrative, rather than restrictive, sense.

What is claimed is:

1. A reluctance-type motor comprising:
    a stator having a plurality of salient stator-poles;
    a rotor having a plurality of salient rotor-poles, said salient stator-poles and said salient rotor-poles formed of laminated sheets of magnetic material, one of said stator-poles and said rotor-poles having a plurality of slits, each of which has a width that is equal to or larger than one fifth of the thickness of each of said laminated sheets;
    a plurality of phase-coils mounted on said salient stator-poles;
    a driver circuit for supplying a drive current to said phase-coils; and
    means for detecting a relative position of said salient rotor-poles and said phase-coils;
    wherein said driver circuit starts to supply said drive current to one of said plurality of phase-coils at a set angle before said salient rotor-poles and those of said salient stator-poles that have said one of said phase-coils mounted thereon come across each other so that said drive current is fully supplied while an inductance of said one of said phase-coils is approximately zero.

2. The reluctance-type motor as claimed in claim 1, wherein
    each of said slits is an open slit that extends to the outer edge of said poles.

3. The reluctance-type motor as claimed in claim 1, wherein
    said plurality of slits of one of said laminated sheets is different in position from another sheet adjacent thereto.

4. The reluctance-type motor as claimed in claim 1, wherein
    said salient rotor pole is formed of two blocks of laminated sheets, and
    one of said blocks has a plurality of slits different in position from the other.

5. The reluctance-type motor as claimed in claim 1, wherein
    said plurality of slits of one of said salient poles is different in position from another salient pole adjacent thereto.

6. The reluctance-type motor as claimed in claim 1, wherein
    said plurality of slits is formed to provide a larger effective air gap at a side of said salient pole of said rotor in a rotating direction than the other side.

7. The reluctance-type motor as claimed in claim 6, wherein
   said side is the front side of said salient pole in said rotating direction.

8. A reluctance-type motor comprising:
   a stator having a plurality of salient stator-poles; a rotor having a plurality of salient rotor-poles, ones of said salient stator-poles and said salient rotor-poles are formed of a plurality of laminated sheets of magnetic material that have a plurality of slits, said plurality of slits formed in an axial direction of said motor at one of said laminated sheets different in position from another;
   a plurality of phase-coils mounted on said salient stator-poles;
   a driver circuit for supplying a d rive current to said phase-coils; and
   means for detecting a relative position of said salient rotor-poles and said phase-coils;
   wherein said driver circuit starts to supply said drive current to one of said plurality of phase-coils at a set angle before said salient rotor-poles and those of said salient stator-poles that have said one of said phase-coils mounted thereon come across each other so that said drive current is fully supplied while an inductance of said one of said phase-coils is approximately zero.

9. The reluctance-type motor as claimed in claim 8, wherein
   said plurality of slits is formed in an axial direction of said motor at one group of said laminated sheets different in position from another.

* * * * *